No. 699,825. Patented May 13, 1902.
M. A. SHIPLEY.
FISHING REEL.
(Application filed Feb. 21, 1902.)
(No Model.)
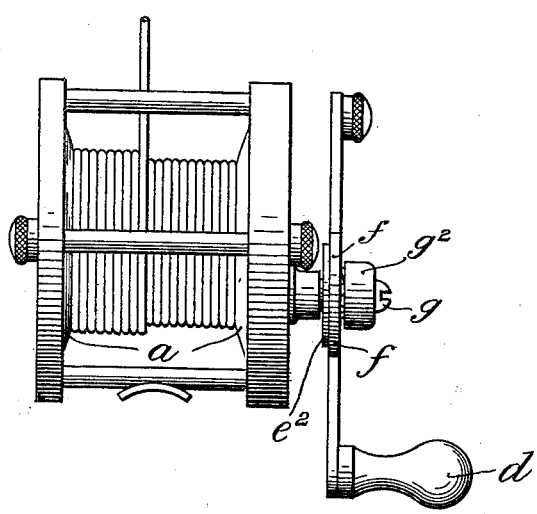
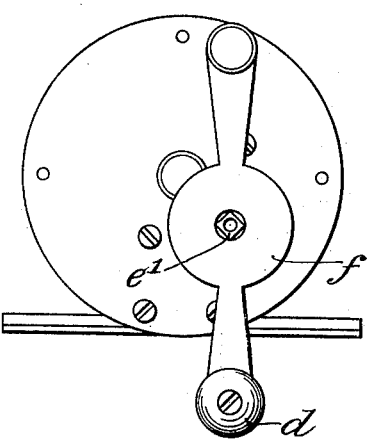
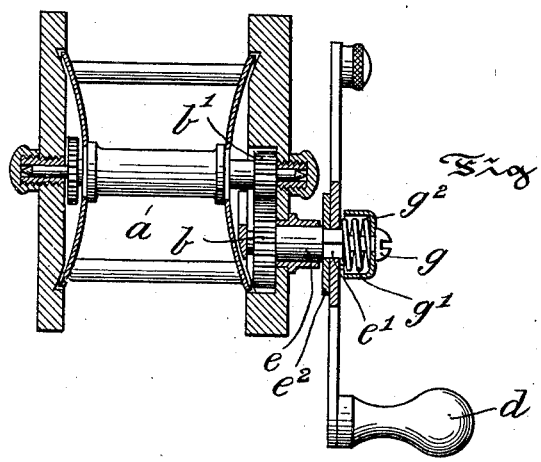

UNITED STATES PATENT OFFICE.

MALCOLM A. SHIPLEY, OF PHILADELPHIA, PENNSYLVANIA.

FISHING-REEL.

SPECIFICATION forming part of Letters Patent No. 699,825, dated May 13, 1902.

Application filed February 21, 1902. Serial No. 95,041. (No model.)

*To all whom it may concern:*

Be it known that I, MALCOLM A. SHIPLEY, a citizen of the United States, residing at the city of Philadelphia, in the county of Philadelphia and State of Pennsylvania, have invented certain new and useful Improvements in Fishing-Reels, of which the following is a specification.

My invention has relation to that class or type of fishing-reels wherein the reel is provided with means whereby the spool of the reel may be wound up by a handle and yet may be unwound, as in the playing of a fish, irrespective of the movement of the handle, the handle and operating means for the spool being held in frictional but not locking engagement; and it relates more particularly to improved means whereby the handle may be frictionally connected to the means for operating the spool of the reel. Heretofore frictional connections between the handle and the spool of the reel have been devised; but in such connections a multiplicity of parts were required, and the arrangement of these parts was liable to accidental disorganization when the reel was in use.

The principal object of my invention is to simplify this frictional connection and by this simplification render the connection less liable to accidental displacement or disorganization.

The nature and scope of my invention will be more fully understood from the following description, taken in connection with the accompanying drawings, forming part hereof, in which—

Figure 1 is an end elevational view of a fishing-reel embodying main features of my invention. Fig. 2 is a side elevational view thereof with a part of the frictional connecting means removed; and Fig. 3 is a longitudinal sectional view of the reel, the section being taken through the frictional connection between the spool and handle of the reel.

Referring to the drawings, $a$ represents the spool of the reel, $b$ and $b'$ the gears for turning said spool, and $d$ the handle proper for operating the gears frictionally, as hereinafter described.

The pinion $b$ of the gears $b$ and $b'$ is provided with an operating-shaft $e$, the forward end $e'$ of which is preferably squared, so as to receive and lock upon said shaft $e$ a disk $e^2$. Other means of locking the disk $e^2$ to the shaft $e$ may be devised without departing from the spirit of my invention. Loosely surrounding the squared end $e'$ of the shaft $e$ is a second disk $f$, formed, preferably, integral with the handle $d$ and turning therewith. The disks $f$ and $e^2$ are held together in frictional engagement by the following means: Into the squared end $e'$ of the shaft $e$ extends a screw-pin $g$, around which is coiled a spiral spring $g'$, preferably located within a cap $g^2$, interposed between the head of the pin $g$ and the squared end of the shaft $e$. This spring $g'$ bears at its inner end against the outer face of the disk $f$ on the handle $d$, and at its outer end it bears against the cap $g^2$ or, if no cap is used, against the head of the pin $g$. When the pin $g$ is advanced in the shaft $e$, the spring $g^2$ will be compressed and will force the disk $f$ against the disk $e^2$ to increase the frictional engagement between the two disks. When the pin $g$ is retracted, the frictional contact of the disks $f$ and $e^2$ will be correspondingly lessened.

In the operation of the reel the frictional contact between the disks $f$ and $e^2$ is sufficient to permit the spool $a$ to be wound up or unwound when the handle $d$ is turned and yet permit the disk $e^2$ and the mechanism it controls to turn independently of the disk $f$ and handle $d$ when there is an undue pull upon the line wound upon the spool $a$, as occurs when the fish is endeavoring to escape. Just what pull upon the line will enable the disk $e^2$ to turn independently of the disk $f$ and handle $d$ can be gaged by adjusting through the pin $g$ the tension of the spring $g^2$. There is thus formed a simple, durable, and efficient means for frictionally connecting the spool and handle and for regulating the extent of the frictional contact, as required.

Having thus described the nature and object of my invention, what I claim as new, and desire to secure by Letters Patent, is—

1. In a fishing-reel, a spool, gearing controlling the rotation of said spool, a shaft controlling said gearing, a friction-disk in locking engagement with said shaft, a second friction-disk loosely turning on the shaft, a handle connected to said friction-disk, a spiral spring bearing against the outer face of the second friction-disk to cause the same to contact with the first friction-disk, and means for adjusting the tension of said spring, substantially as and for the purposes described.

2. In a fishing-reel, a shaft controlling the movement of the spool of the reel, a disk locked to said shaft, a handle formed with a second friction-disk loosely turning upon the end of said shaft, a headed pin adapted to be advanced or retracted in the end of said shaft, and a spiral spring coiled around said pin, one end of said spring bearing against the head of the pin and the other end bearing upon the disk of the handle to force said disk into frictional contact with the disk locked to said shaft, substantially as and for the purposes described.

3. In a fishing-reel, a shaft controlling the movement of the spool of the reel, a disk locked to said shaft, a handle formed with a second friction-disk loosely turning upon the end of said shaft, a headed pin adapted to be advanced or retracted in the end of said shaft, a spiral spring coiled around said pin, one end of said spring bearing upon the head of the pin and the other end bearing upon the disk of the handle, and a cap inclosing said spring and interposed between the head of the pin and the end of the shaft, substantially as and for the purposes described.

In testimony whereof I have hereunto set my signature in the presence of two subscribing witnesses.

MALCOLM A. SHIPLEY.

Witnesses:
J. WALTER DOUGLASS,
THOMAS M. SMITH.